(12) United States Patent
Stamper

(10) Patent No.: US 6,773,065 B1
(45) Date of Patent: Aug. 10, 2004

(54) RECLINING CHANGING SEAT

(76) Inventor: Laura Stamper, 6848 Palmetto Cir. South #1208, Boca Raton, FL (US) 33433

( * ) Notice: Subject to any disclaimer, the term of this patent is extended or adjusted under 35 U.S.C. 154(b) by 0 days.

(21) Appl. No.: 10/137,240

(22) Filed: Aug. 2, 2002

(51) Int. Cl.$^7$ .............................................. A47C 1/024
(52) U.S. Cl. .............................. 297/256.12; 297/250.1; 297/256.13
(58) Field of Search ....................... 297/256.12, 256.13, 297/256.16, 354.13, 343, 320, 317, 250.1

(56) References Cited

U.S. PATENT DOCUMENTS

| | | | | | |
|---|---|---|---|---|---|
| 3,124,388 | A | * | 3/1964 | Berlin ......................... | 297/320 |
| 3,359,035 | A | * | 12/1967 | Schiffman .................... | 297/317 |
| 3,404,917 | A | * | 10/1968 | Smith ....................... | 297/256.1 |
| 4,762,364 | A | * | 8/1988 | Young .................... | 297/256.12 |
| 5,112,109 | A | * | 5/1992 | Takada et al. .............. | 297/343 |
| 5,524,964 | A | * | 6/1996 | Weimersheimer ...... | 297/256.12 |
| 6,196,629 | B1 | * | 3/2001 | Onishi et al. .......... | 297/256.12 |
| 6,241,314 | B1 | * | 6/2001 | Pufall ..................... | 297/256.12 |
| 6,283,545 | B1 | * | 9/2001 | Ernst ...................... | 297/256.16 |
| 6,322,142 | B1 | * | 11/2001 | Yoshida et al. .......... | 297/250.1 |
| 6,431,647 | B2 | * | 8/2002 | Yamazaki .............. | 297/256.12 |
| 6,505,887 | B2 | * | 1/2003 | Hampton ................. | 297/256.1 |

* cited by examiner

Primary Examiner—Peter M. Cuomo
Assistant Examiner—Stephen D'Adamo (57) ABSTRACT

A reclining seat having a L-shaped base unit and a seat with a reclining seat portion is described. The seat may be pulled out from the base unit, rotated with respect to the base unit and the reclining seat portion reclined to form a substantially horizontal surface, which may be used as a diaper-changing surface. If the reclining seat is a car safety seat, the base unit may accommodate a safety belt. The present invention also comprises a method of changing a child's diaper without removing the child from a car seat.

20 Claims, 7 Drawing Sheets

RECLINING CHANGING SEAT

BACKGROUND OF THE INVENTION

1. Field of the Invention

The present invention relates to a Reclining Changing Seat for use in connection with changing children's diapers. The Reclining Changing Seat has particular utility in connection with a car safety seat having a reclining seat to permit a child to be diapered without removal of the child from the seat.

2. Description of the Prior Art

Reclining Seats are desirable for the convenience of placing an infant or child in a position better suited for sleep.

The use of Reclining Seats is known in the prior art. For example, U.S. Pat. No. 3,669,492 to Peterson discloses an infant car seat that can be moved into a reclining position. The car seat disclosed by Peterson '492 reclines to a small degree that may permit an infant riding in the seat to be more comfortable but does not recline to such a degree that would is permit the infant's diaper to be changed while keeping the infant in the seat.

Similarly, U.S. Pat. No. 4,770,468 to Shubin discloses a child safety car seat that can be tilted as a unit so that the passenger may lean back and sleep. The car seat disclosed by Shubin '468 tilts to a small degree that may permit an infant riding in the seat to sleep more comfortably. However, the car seat of Shubin '468 does not tilt to such a degree that would permit the infant's diaper to be changed while keeping the infant in the seat.

U.S. Pat. No. 5,852,838 to Johnson discloses a cushion to be added to a car seat that provides a substantially flat diaper-changing surface. However, the cushion of the Johnson '838 disclosure is not itself integral with the car seat.

Similarly, U.S. Pat. No. 5,826,287 to Tandrup discloses a device for supporting and positioning infants. The Tandrup '287 device provides cushioning and a safety strap. However, the Tandrup '287 patent does not teach or suggest a device that serves to keep an infant in a sitting position wherein the device may also recline to a substantially horizontal position so as to serve as a diaper changing surface. Lastly, U.S. Pat. No. Des. 4276,785 to Kassai discloses a car seat that has a seat portion and a base portion. However, the car seat of Kassai '785 does not have a seat portion that reclines to a substantially horizontal position to permit the infant's diaper to be changed while keeping the infant in the seat.

While the above-described devices fulfill their respective, particular objectives and requirements, the aforementioned patents do not describe a reclining changing seat that allows a child's diaper to be changed while the child remains in the seat. The Peterson '492, Shubin '468 and Kassai '785 patents each make no provision for child safety seat a portion of which reclines to a substantially horizontal position while the child remains in the seat to permit a diaper to be easily changed. The device of the Tandrup '287 patent makes no provision of use of the device in the sitting position and no suggestion to recline a child from the sitting position within the device to permit a diaper to be changed. The cushion of the Johnson '838 patent is not integral with the car seat but rather added to an existing seat for a temporary changing surface. The Johnson '838 patent makes no provision for a car seat that is itself adjustable to accommodate diaper changes.

Therefore, a need exists for a new and improved Reclining Changing Seat, which can be used for reclining an infant in a car seat to a substantially horizontal position to permit a child to be diapered without removing the child from the car seat. In this regard, the present invention substantially fulfills this need. In this respect, the Reclining Changing Seat according to the present invention substantially departs from the conventional concepts and designs of the prior art, and in doing so provides an apparatus primarily developed for the purpose of reclining a child sitting in a car seat having a reclining changing seat so that the child may be diapered without removing the child from the seat.

SUMMARY OF THE INVENTION

In view of the foregoing disadvantages inherent in the known types of Reclining Seats now present in the prior art, the present invention provides an improved Reclining Changing Seat, and overcomes the above-mentioned disadvantages and drawbacks of the prior art. As such, the general purpose of the present invention, which will be described subsequently in greater detail, is to provide a new and improved Reclining Changing Seat and method of changing an child's diaper which has all the advantages of the prior art mentioned heretofore and many novel features that result in a Reclining Changing Seat which is not anticipated, rendered obvious, suggested, or even implied by the prior art, either alone or in any combination thereof.

To attain this, the present invention essentially comprises a reclining seat having a substantially L-shaped base unit and a seat having a reclining seat portion. The seat may be pulled out from the base unit, rotated with respect to the base unit and the reclining seat portion reclined to form a substantially horizontal surface.

The present invention also comprises a car safety seat having a reclining seat where the car safety seat essentially comprises a substantially L-shaped base unit that accommodates a safety belt and a seat having a reclining seat portion. The seat portion may be pulled out from the base unit, rotated with respect to the base unit and the reclining seat portion reclined to form a substantially horizontal surface.

The substantially horizontal surface of the reclining seat or car safety seat with reclining seat may be used as a diaper-changing surface. Preferably, the reclining seat or car safety seat with reclining seat would also comprise means of storing diaper-changing essentials in a handy location.

The present invention also comprises a method of changing a child's diaper without removing the child from a car seat, the method essentially comprising activating a locking release mechanism to release a seat of the car seat from a base unit, pulling and rotating the seat of the car seat with respect to a safety belted base unit of the car seat, reclining a reclining seat portion so that the child and the reclining seat portion are in a substantially horizontal position, and changing the child's diaper.

There has thus been outlined, rather broadly, the more important features of the invention in order that the detailed description thereof that follows may be better understood and in order that the present contribution to the art may be better appreciated.

The invention may also include a reclining seat portion that may be rotated to the left or right. The seat portion and the base unit of the present invention may be permanently attached to each other to enhance the safety of the seat. The seat may be secured to the base unit with a locking mechanism to prevent undesired movement of the seat. The reclining seat portion of the present invention may be reclined by activating a locking release mechanism, pulling and rotating the seat with respect to the base unit and reclining the reclining seat portion by pulling the bottom of the seat while simultaneously reclining the seat back. The seat of the present invention may be connected to the base unit via a sliding, revolving mechanism and a track. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Reclining Changing Seat that has all of the advantages of the prior art Reclining Seats and none of the disadvantages.

It is another object of the present invention to provide a new and improved Reclining Changing Seat that may be easily and efficiently manufactured and marketed.

An even further object of the present invention is to provide a new and improved Reclining Changing Seat that has a low cost of manufacture with regard to both materials and labor, and which accordingly is then susceptible of low prices of sale to the consuming public, thereby making such Reclining Changing Seat economically available to the buying public.

Still another object of the present invention is to provide a new Reclining Changing Seat that provides in the apparatuses and methods of the prior art some of the advantages thereof, while simultaneously overcoming some of the disadvantages normally associated therewith.

Even still another object of the present invention is to provide a Reclining Changing Seat that permits a child's diaper to be changed without removing the child from a car safety seat.

Still yet another object of the present invention is to provide a Reclining Changing Seat that would provide parents access to a safe sanitary diaper-changing site during a long car trip, or when diaper-changing facilities are not available.

Lastly, it is an object of the present invention to provide a new and improved method of changing a child's diaper without removing the child from a car seat, the method essentially comprising activating a locking release mechanism to release a seat portion of the car seat from a base unit, pulling and rotating a seat portion of the car seat with respect to a safety belted base unit of the car seat, reclining the reclining seat portion so that the child and the reclining seat portion are in a substantially horizontal position, and changing the child's diaper.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1–7, a preferred embodiment of the Reclining Changing Seat of the present invention is shown and generally designated by the reference numeral 10.

Figure 1:
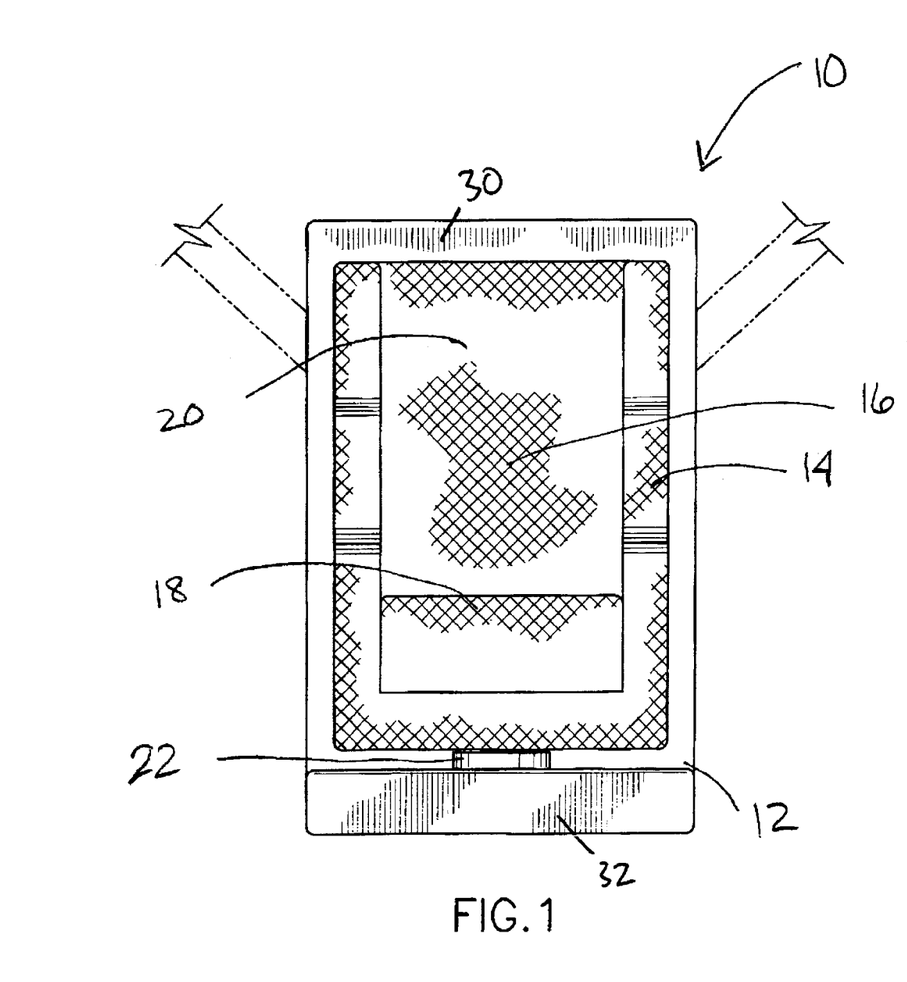
FIG. 1 is a perspective view of the front of the preferred embodiment of the Reclining Changing Seat constructed in accordance with the principles of the present invention.

In FIG. 1, a new and improved Reclining Changing Seat 10 of the present invention for changing a child's diaper while keeping the child in a seat is illustrated and will be described. More particularly, the Reclining Changing Seat 10 has a base unit 12 and a seat 14. The seat 14 having a reclining seat portion 16, the reclining seat portion 16 having at least a seat bottom 18 and a seat back 20. The reclining seat portion 16 is preferably padded for comfort and covered in a soft but durable material that may be removed and laundered as needed. The portion of the seat 14 to accommodate a seated child is also preferably padded for comfort and covered in a soft but durable material that may be removed and laundered as needed. The seat 14 may be connected to the base unit 12 by a mechanism 22 that permits the seat 14 to be moved with respect to the base unit 12. The mechanism 22 may move the seat 14 relative to the base unit 12 by sliding and revolving the mechanism 22. The base unit 12 may be secured within an automobile by a safety belt, shown in FIG. 1 by the dotted/dashed line. While the preferred embodiment of the Reclining Changing Seat 10 of the present invention encompasses a base unit 12 securable by a safety belt, any reclining changing seat suitable for use with children is envisioned. For example, a bouncy seat or other seated infant product may be adapted to contain a reclining changing seat. Further the base unit 12, may be securable by a safety belt into a automobile, bus, train, airplane or other vehicle.

Figure 2:
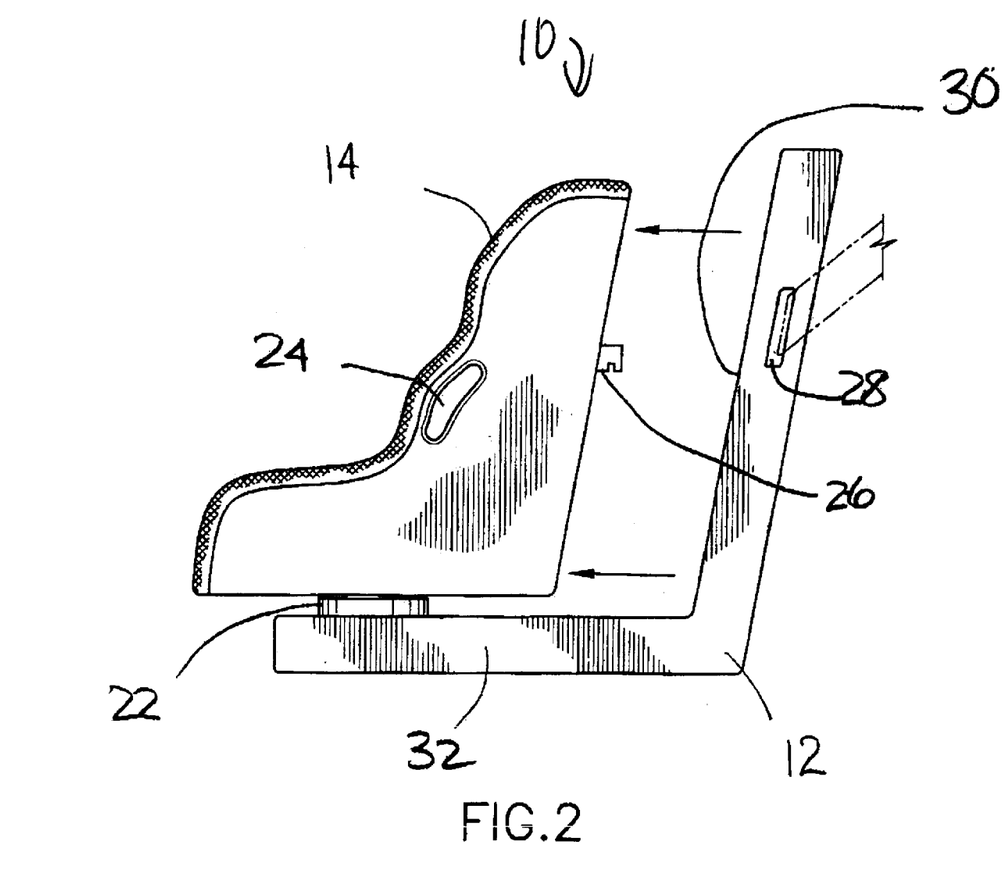
FIG. 2 is a side elevational view of the Reclining Changing Seat of the present invention.

As shown in FIG. 2, a side elevational view of the Reclining Changing Seat of the present invention, the seat 14 may be moved with respect to the base unit 12 via a mechanism 22. As shown by the horizontal arrows in FIG. 2, the seat 14 of the Reclining Changing Seat of the present invention may be pulled out from the substantially L-shaped base unit 12. The base unit 12 comprises a bottom portion 32 housing the sliding, rotating mechanism 22 and a back support portion 30. Turning now to the seat 14 of the present invention, as can be envisioned from the front view of FIG. 1 and the side view of FIG. 2, the portion of the seat 14 where a child will sit is covered in a padding and soft but durable material in the seat portion but the sides and back of the seat 14 may not be covered with the same padding. The Reclining Changing Seat of the present invention may additionally comprise a handle 24 on either side of the seat 14 to permit easier handling and reclining of the seat. The Reclining Changing Seat of the present invention may additionally comprise a seat lock 26 on the back of the seat 14 that will secure the seat 14 of the Reclining Changing Seat to the base unit 12, the back support portion 30 of the base 12 unit having means for accommodating the seat lock not shown in FIG. 2. The back support portion 30 of the base unit 12 may also comprise means for accommodating a safety belt 28 as shown in FIG. 2. However, the seat 14 and base unit 12 of the present invention may be adapted for any seated infant device in addition to a car safety seat and in that case, means for accommodating a safety belt may not be necessary in a base unit 12.

Figure 3:
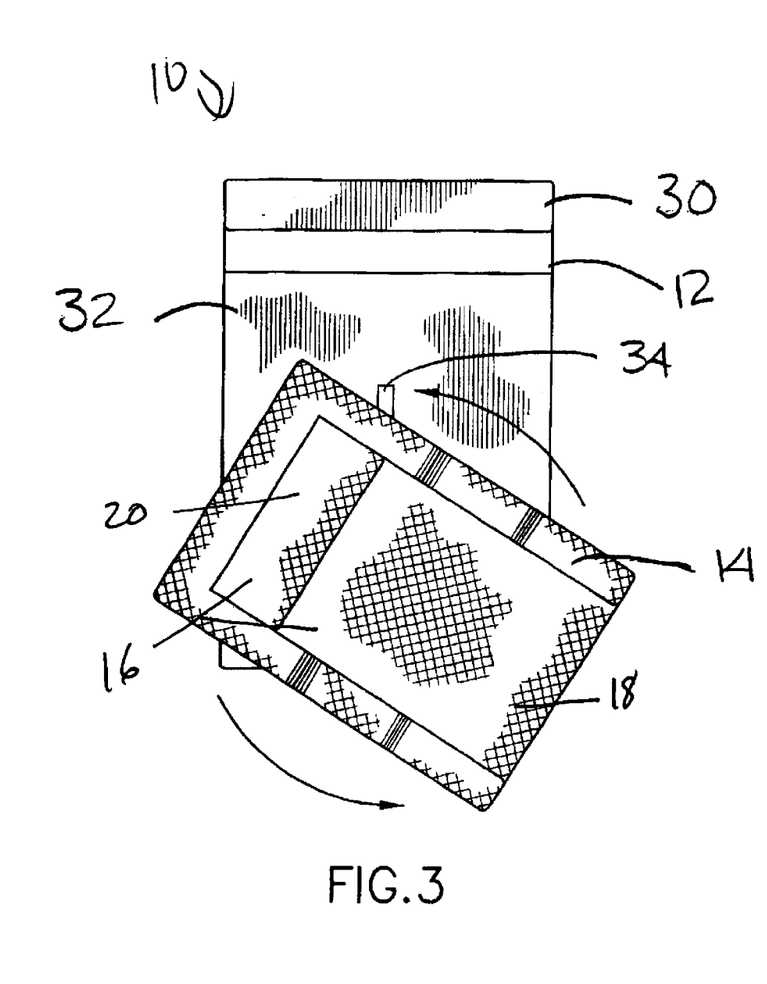
FIG. 3 is a top plan view of the Reclining Changing Seat of the present invention.

FIG. 3 is a top plan view of the Reclining Changing Seat of the present invention demonstrating that the seat 14 of the Reclining Changing Seat of the present invention may be rotated with respect to the base unit 12. The arrows of FIG. 3 demonstrate rotation of the seat 14 to the left relative to the base unit 12. The seat 14 may also be rotated to the right relative to the base unit 12. Taken together with FIG. 2, it can be seen that the seat 14 of the Reclining Changing Seat of the present invention may be both pulled out from the base unit 12 and rotated relative to the base unit 12. Also partially visible in FIG. 3 is a track 34 located in the bottom portion 32 of the base unit 12. The track 34 may be used in combination with the mechanism 22, not shown, to permit the pulling and rotating of the seat 14 relative to the base unit 12. However, other means of permitting movement of the seat 14 relative to the base unit 12 are envisioned. Preferably, the seat 14 is rotated sideways so that it is positioned at approximately a 90-degree angle to the base unit 12.

Figure 4:
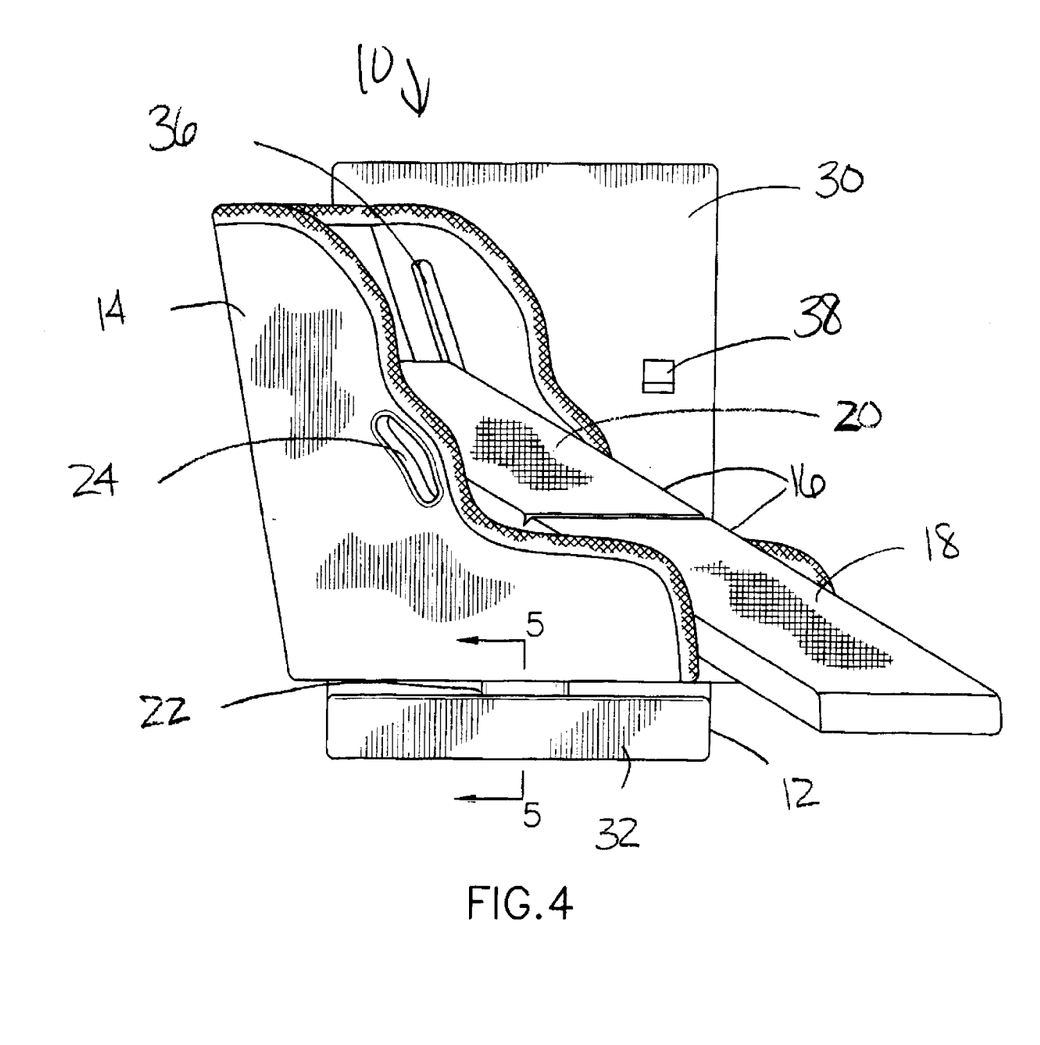
FIG. 4 is a front elevational view of the Reclining Changing Seat of the present invention in a reclined position.

FIG. 4 is a front elevational view of the Reclining Changing Seat of the present invention in a reclined position. Once the seat 14 of the Reclining Changing Seat of the present invention has been pulled from the base unit 12 as described in FIG. 2 and the seat 14 rotated with respect to the base unit 12 as described in FIG. 3, the reclining seat portion 16 may be reclined. In the reclined position, the seat bottom 18 and the seat back 20 of the reclining seat portion 16 form a substantially horizontal surface useful for changing a child's diaper. The reclining seat portion 16 maybe reclined by pulling out the seat bottom 18 while the seat back 20 simultaneously reclines. As shown in FIG. 4, the seat back 20 may slide upon a seat back track 36 to make the reclining process smooth and consistent. A seat back track 36 may be located on each side of the seat 14 so that the reclining seat portion 16 may be reclined when the seat 14 is rotated to both the left and the right thereby permitting maximum versatility. Other means of providing a reclining seat portion 16 are also encompassed by the present invention. For example, a latch may serve to recline the seat bottom 18. Other means of lowering the seat back 20 are also encompassed by the present invention in addition to the seat back track 36 described. As described above in FIG. 2, the back support portion 30 of the base 12 unit may have means for accommodating the seat lock 38 located on the back of the seat 14.

Figure 5:
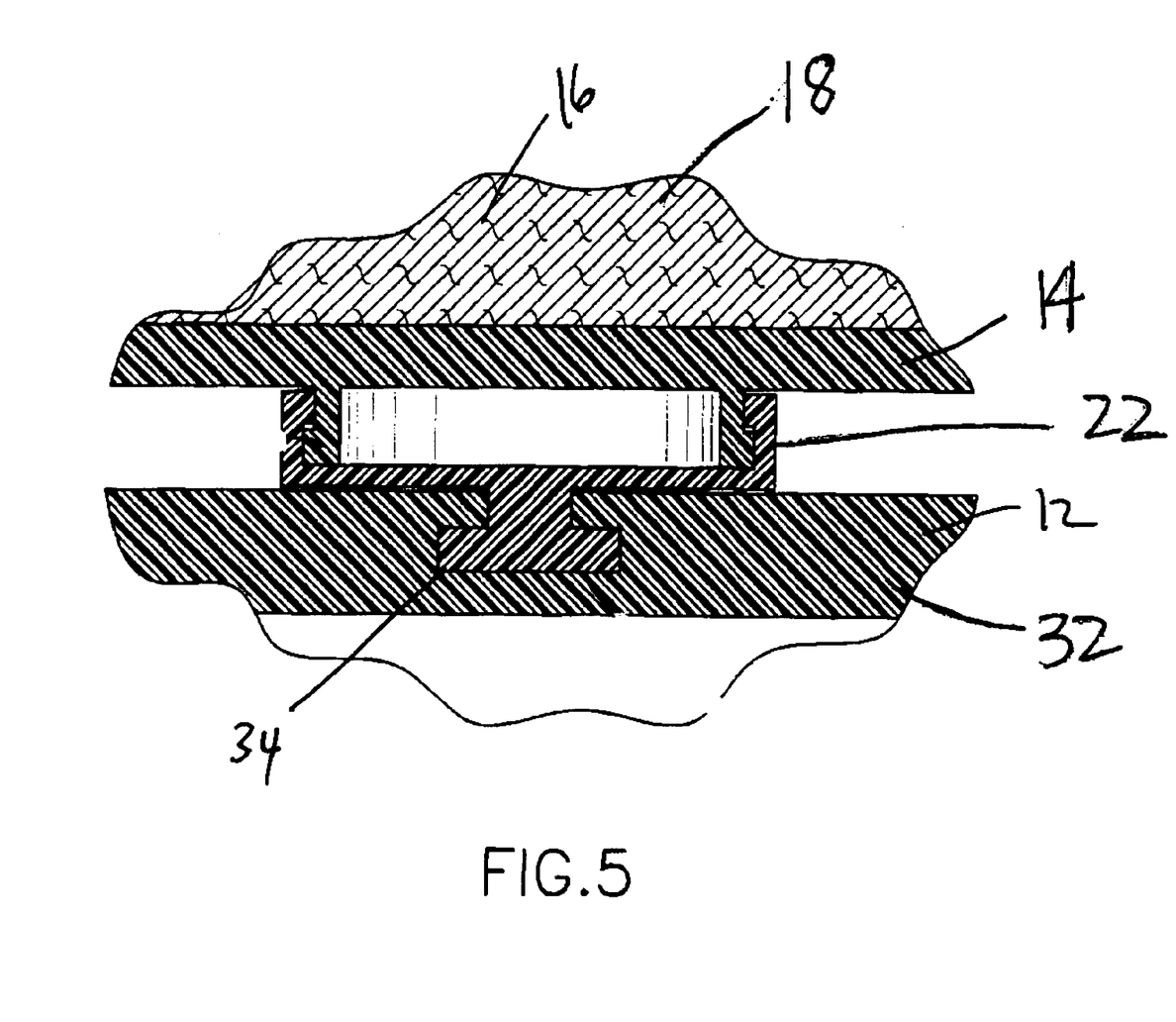
FIG. 5 is an exploded cross-sectional view taken along the 5—5 axis of FIG. 4 of the Reclining Changing Seat of the present invention.

FIG. 5 is an exploded cross-sectional view taken along the 5—5 axis of FIG. 4 of the Reclining Changing Seat of the present invention showing the connection between the seat 14 and the bottom 32 of the base unit 12. The sliding, revolving mechanism 22 is accommodated in a track 34 in the bottoms 32 of the base unit 12. The sliding, revolving mechanism 22 serves to connect the seat 14 and the base unit 12. The seat 14 and the bottom 30 of the base unit 12 may be permanently secured together to enhance the safety of the Reclining Changing Seat of the present invention. Other mechanisms that connect seat 14 and the bottom 30 of the base unit 12 are encompassed by the present invention provided the mechanisms permit the seat 14 to be pulled and rotated with respect to the base unit 12. For example, the Reclining Changing Seat of the present invention may contain more than one mechanism, one at each end of the seat 14. Alternatively, a ratcheted system may be used instead of the tracks 34 for accommodating a sliding and rotating mechanism 22. Further, separate sliding and rotating mechanisms may be provided. The sliding and rotating mechanism 22 may be made of any appropriate durable material.

Figure 6:
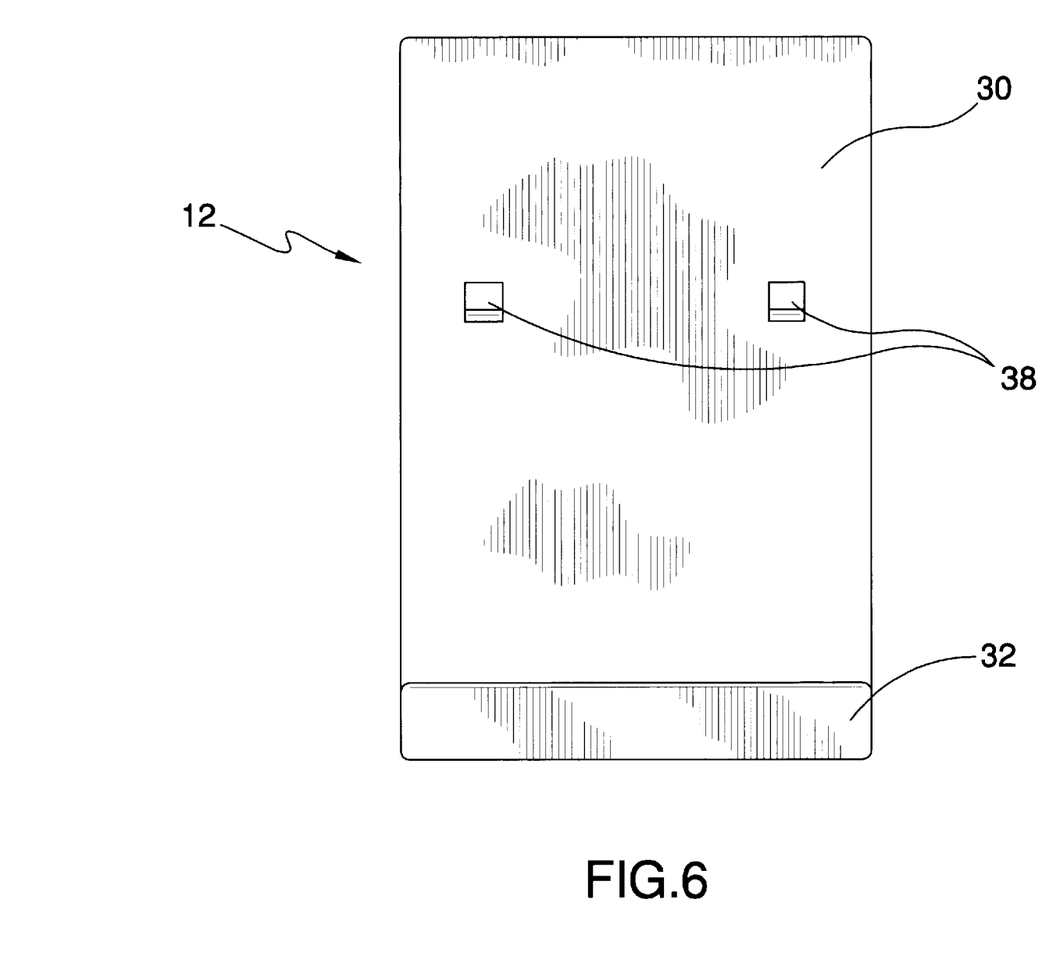
FIG. 6 is a front perspective view of the base unit of the Reclining Changing Seat of the present invention.

FIG. 6 is a front perspective view of the base unit 12 of the Reclining Changing Seat of the present invention. The base unit 12 comprises bottom 32 and back support 30 portions. The base unit 12 may comprise means 38 for accommodating seat locks located on the back of a seat 14. The base unit 12 may be constructed of any appropriate material, particularly materials that meet safety standards, if the unit is to be used as a car seat. The base unit 12 may be of any appropriate size and dimensions to accommodate a seat 14.

Figure 7:
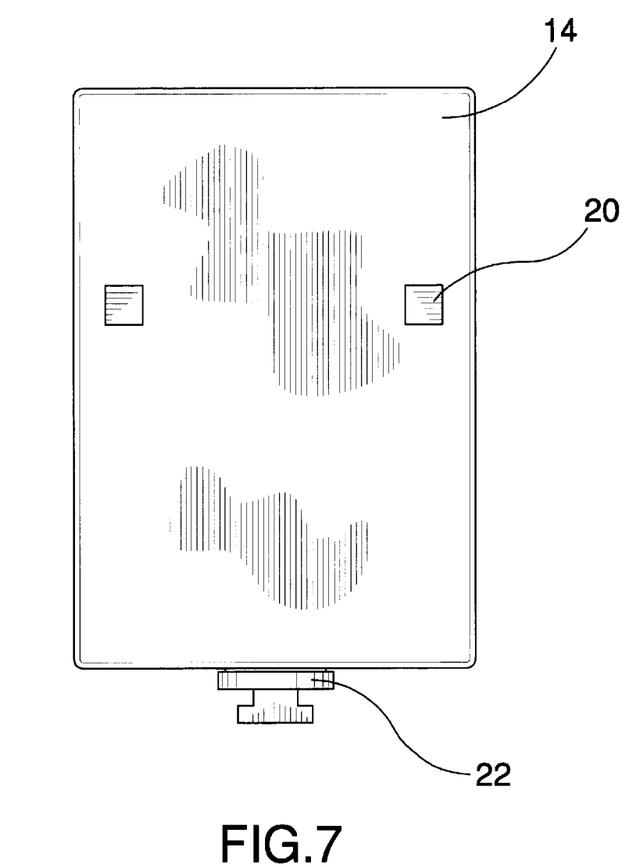
FIG. 7 is a perspective view of the back of the seat portion of the Reclining Changing Seat of the present invention.

FIG. 7 is a perspective view of the back of the seat portion of the Reclining Changing Seat of the present invention. The back of the seat 14 having seat locks 26 and an attached sliding, revolving mechanism 22 is shown. The seat 14 of the Reclining Changing Seat of the present invention may be made of any appropriate material and any suitable dimensions. Preferably, if the seat 14 is to be used as a car safety seat, materials that meet safety standards and dimensions are used. Different embodiments of the seat locks 26 are also encompassed by the present invention. For example, there may be a single seat lock 26 located on the back of the seat 14 and a single means for accommodating the seat lock 38 located in the back support 30 of the base unit 12. The seat lock may be made in any configuration and of any appropriate Preferably, if the seat 14 is to be used as a car safety seat, materials that meet safety standards and dimensions are used for the seat lock 26 and the means for accommodating the seat lock 38. The seat lock 26 may be released so that the seat may be used as a diaper-changing surface by any appropriate means. For example, a lock release may be located as a button near each of the handles 24 located on opposite sides of the seat 14 so that the user may easily depress each button, thereby releasing the seat lock 26 from the means for accommodating the seat lock 38 and easily pull the seat 14 from the base unit 12. However, the release means for unlocking the seat lock 26 from the means for accommodating the seat lock 38 may also be located at other sites on the seat 14 or base unit 12. For example, at the top of the seat 14 or base unit 12. Such means may be desirable if handles are not provided on the seat or if it is desired to keep the release means out of a child's reach.

In use, it can now be understood that the Reclining Changing Seat of the present invention provides a seat for a child or infant that keeps the child in the sitting position while also enabling the seat to be temporarily reclined, for example, to change a child's diaper without removing the child from the seat. Particularly, in the case of a reclining seat, a seat portion may be pulled from a base unit and rotated with respect to that base unit, and a reclining seat portion of the seat reclined so that the reclining seat portion and the child are in a substantially horizontal position, this position being convenient for changing a child's diaper. In another embodiment of the Reclining Changing Seat of the present invention, the seat serves as a safety car seat. In this case, while the reclining seat functions as described above, the base unit is secured to an automobile or the like by a safety belt and the base unit, seat and other components are manufactured to meet car seat safety standards. In yet another embodiment of the present invention, a method of changing a child's diaper while the child remains seated in a reclining seat is encompassed. In particular, the method essentially comprises activating a locking release mechanism, the locking mechanism securing a seat portion to a base unit, pulling and rotating the seat with respect to base unit and reclining a reclining seat portion of the seat so that the child and the reclining seat portion are in a substantially horizontal position, and changing the child's diaper.

The Reclining Changing Seat of the present invention permits the user to change a child's diaper without removing the child from the seat. Preferably, when the Reclining Changing Seat of the present invention is in the form of a car safety seat, the base unit is secured to an automobile's seat with a safety belt and the seat portion is permanently attached to the base unit but movable with respect to the base unit and the base unit and seat portion are made of material that meets safety standards. The seat portion may lock into the base unit with a releasable locking mechanism. When the locking mechanism is released, the seat portion may be pulled forward from the base unit, on a track or similar mechanism and rotated with respect to the base unit with a rotatable mechanism. The seat portion comprises a reclining seat portion that may be reclined to a substantially horizontal position to permit the child's diaper to be changed. The Reclining Changing Seat of the present invention would permit a diaper to be changed in a car without having to remove the child from the car seat. This makes the task of changing a diaper easier to accomplish and less frustrating. The Reclining Changing Seat of the present invention provides parents with a convenient and sanitary to change diapers thus providing an advantage when traveling to locations where changing stations may not be offered or may not be clean. While numerous restaurants and rest stops provide diaper-changing areas in their restroom facilities, many do not and further, some may be offered only in the ladies restroom, leaving Dad with few available options. Further, changing a child on the seat of a car is often difficult because a secure and substantially horizontal position may not be available. Therefore, the Reclining Changing Seat of the present invention provides parents with a convenient means of changing diapers when other facilities are not available or perhaps when the child is already asleep in the Reclining Changing Seat.

While a preferred embodiments of the Reclining Changing Seat has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable material may be used to construct the reclining changing seat. And although a car safety seat and reclining seat have been described, it should be appreciated that the Reclining Changing Seat herein described is also suitable for any device for seating a child.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A reclining seat comprising:
   a substantially L-shaped base unit having a back and a bottom;
   a seat having a back, a bottom, and opposing sides with said bottom slidably and rotatable mounted on said bottom of said base unit;
   a plurality of seat back tracks wherein said opposing sides of said seat define slots therein to comprise said seat back tracks; and
   a reclining seat portion having opposing sides and a foldable middle, which divides said reclining seat portion into a seat bottom and a seat back, wherein said opposing sides are slidably attached to said seat back tracks and said middle may unfold to form a substantially horizontal surface.

2. The reclining seat of claim 1 wherein said reclining seat portion may be used as a child diaper changing pad.

3. The reclining seat of claim 1, wherein said seat may be rotated to the left or right.

4. The reclining seat of claim 1, wherein said seat and said base unit are permanently attached to each other.

5. The reclining seat of claim 1, wherein said seat is secured to said base by a seat lock removably inserted into a means for accommodating the seat lock present in said back of said base unit to prevent undesired movement of said seat.

6. The reclining seat of claim 5, wherein the reclining seat portion is reclined by releasing said seat lock from said means for accommodating the seat lock, pulling said seat out and rotating it with respect to said base unit and reclining said reclining seat portion by pulling out said seat bottom while simultaneously sliding said seat back within said seat back tracks.

7. The reclining seat of claim 1, wherein said seat is connected to said base unit by a sliding revolving mechanism and a track.

8. The reclining seat as defined in claim 1, further comprising a handle wherein at least one of said opposing sides of said seat defines a hole therein to comprise said handle.

9. The reclining seat as defined in claim 1, wherein said reclining seat portion is covered by one of the group consisting of rubber, cloth, plastic, and leather.

10. The reclining seat as defined in claim 1, further comprising means to secure a safety belt to said base unit wherein said back of said base unit defines a hole therein to comprise said means to secure a safety belt to said base unit.

11. A reclining car safety seat comprising:
- a seat bottom having opposing ends;
- a seat back having opposing sides and opposing ends with one end foldably attached to one of said ends of said seat bottom;
- a seat having a back, a bottom, and opposing sides with said opposing sides slidably attached to said opposing sides of said seat back; and
- a base unit having a back and a bottom with said bottom attached to said bottom of said seat.

12. The reclining car safety seat of claim 11, wherein said seat bottom and said seat back may be reclined to be used as a child diaper changing pad.

13. The reclining car safety seat of claim 11, wherein said seat is slidably and rotatably mounted on said base unit.

14. The reclining car safety seat of claim 11, wherein said seat and said base unit are permanently attached to each other.

15. The reclining car safety seat of claim 11, wherein said seat is secured to said base unit by a seat lock removably inserted into a means for accommodating the seat lock present in said back of said base unit to prevent undesired movement of said seat.

16. The reclining car safety seat of claim 15, wherein said seat bottom and said seat back are reclined by releasing said seat lock from said means for accommodating the seat lock, pulling said seat out and rotating it with respect to said base unit, and reclining said seat bottom and said seat back by pulling out said seat bottom while simultaneously sliding said seat back within said opposing sides of said seat.

17. The reclining car safety seat of claim 11, wherein said seat is connected to said base unit by a sliding revolving mechanism and a track.

18. The reclining car safety seat as defined in claim 11, further comprising a handle wherein at least one of said opposing sides of said seat defines a hole therein to comprise said handle.

19. The reclining car safety seat as defined in claim 11, wherein said seat back and said seat bottom are covered by one of the group consisting of rubber, cloth, plastic, and leather.

20. A method of changing a child's diaper, wherein a child is sitting in a car seat secured to a car by a safety belt having a base unit, a seat lock, a means for accommodating the seat lock, a plurality of seat back tracks, and a reclining seat portion having a seat back and a seat bottom, the method comprising the steps of:
- releasing said seat lock from said means for accommodating the seat lock to release said seat of said car seat from said safety-belted base unit of said car seat;
- pulling and rotating said seat of said car seat with respect to said base unit of said car seat;
- pulling out said seat bottom of said reclining seat portion while simultaneously reclining said seat back of said reclining seat portion by sliding it within said seat back tracks, thereby placing said child and said reclining seat portion in a substantially horizontal position; and
- changing the child's diaper.

* * * * *